(12) United States Patent
Layouni et al.

(10) Patent No.: US 12,326,341 B2
(45) Date of Patent: Jun. 10, 2025

(54) SYSTEM FOR PROVIDING PARKING GUIDANCE TO A VEHICLE

(71) Applicant: GM Global Technology Operations LLC, Detroit, MI (US)

(72) Inventors: Mohamed A. Layouni, Fraser, MI (US); Markus Jochim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 278 days.

(21) Appl. No.: 18/046,220

(22) Filed: Oct. 13, 2022

(65) Prior Publication Data

US 2024/0125614 A1     Apr. 18, 2024

(51) Int. Cl.
| | | |
|---|---|---|
| *G01C 21/36* | (2006.01) | |
| *B60R 1/26* | (2022.01) | |
| *G06T 7/60* | (2017.01) | |
| *G06V 10/70* | (2022.01) | |
| *G06V 20/56* | (2022.01) | |
| *G06V 20/58* | (2022.01) | |

(52) U.S. Cl.
CPC ............ *G01C 21/3685* (2013.01); *B60R 1/26* (2022.01); *G01C 21/3602* (2013.01); *G01C 21/3647* (2013.01); *G06T 7/60* (2013.01); *G06V 20/58* (2022.01); *G06V 20/588* (2022.01); *B60R 2300/806* (2013.01); *G06T 2207/30256* (2013.01); *G06T 2207/30261* (2013.01); *G06V 10/70* (2022.01); *G06V 2201/08* (2022.01)

(58) Field of Classification Search
CPC ............ G01C 21/3685; G01C 21/3602; G01C 21/3647; G06V 20/58; G06V 20/588; G06V 10/70; G06V 2201/08; B60R 1/26; B60R 2300/806; G06T 7/60; G06T 2207/30256; G06T 2207/30261
USPC ................................ 701/468, 32.3–32.4, 44
See application file for complete search history.

(56) References Cited

U.S. PATENT DOCUMENTS

| | | | | |
|---|---|---|---|---|
| 7,834,778 B2* | 11/2010 | Browne | .................... | G08G 1/14 |
| | | | | 705/13 |
| 9,843,777 B2* | 12/2017 | Schofield | .................. | B60R 1/04 |
| 10,308,181 B2* | 6/2019 | Nix | .......................... | G06V 20/58 |
| 11,117,520 B2* | 9/2021 | Shimizu | .................... | H04N 7/18 |
| 12,071,075 B1* | 8/2024 | Hubbell | .................... | B60R 1/00 |
| 12,128,878 B1* | 10/2024 | Funke | .................... | G08G 1/146 |
| 2007/0057816 A1* | 3/2007 | Sakakibara | ........ | B62D 15/0275 |
| | | | | 340/932.2 |

(Continued)

*Primary Examiner* — Manglesh M Patel
(74) *Attorney, Agent, or Firm* — Vivacqua Crane, PLLC (57) ABSTRACT

A parking system for a vehicle including a braking system, including one or more cameras capturing image data representative of an environment surrounding the vehicle, and a display located within an interior cabin of the vehicle. The display shows image data representative of the environment surrounding the vehicle. The parking system also includes one or more controllers in electronic communication with the one or more cameras and the display. The one or more controllers execute instructions to determine the user is about to execute a parking maneuver based on the image data collected by the one or more cameras. In response to determining the user is about to execute the parking maneuver, the one or more controllers instruct the display to show the image data representative of the environment surrounding the vehicle.

19 Claims, 7 Drawing Sheets

(56) References Cited

U.S. PATENT DOCUMENTS

| | | | |
|---|---|---|---|
| 2009/0303027 A1* | 12/2009 | Nagamine | G08G 1/168 340/686.6 |
| 2010/0033348 A1* | 2/2010 | Kawabata | B62D 15/028 340/932.2 |
| 2010/0198458 A1* | 8/2010 | Buttolo | G01C 21/3652 701/532 |
| 2014/0081476 A1* | 3/2014 | Verdugo-Lara | B62D 15/027 701/1 |
| 2015/0248835 A1* | 9/2015 | Aravkin | G08G 1/146 340/932.2 |
| 2015/0302611 A1* | 10/2015 | Fan | G06V 20/56 382/104 |
| 2018/0137380 A1* | 5/2018 | Alrefai | B60T 7/22 |
| 2018/0164830 A1* | 6/2018 | Moosaei | G08G 1/146 |
| 2018/0218604 A1* | 8/2018 | Astigarraga | G01C 21/3685 |
| 2018/0240341 A1* | 8/2018 | Hetz | B60L 53/305 |
| 2019/0100147 A1* | 4/2019 | Fang | B60K 35/265 |
| 2019/0212749 A1* | 7/2019 | Chen | B62D 15/025 |
| 2019/0244102 A1* | 8/2019 | Harvey | G06N 3/08 |
| 2019/0266418 A1* | 8/2019 | Xu | G06V 10/457 |
| 2020/0160712 A1* | 5/2020 | Beaurepaire | G08G 1/148 |
| 2020/0226778 A1* | 7/2020 | Zhang | G06T 7/60 |
| 2020/0258385 A1* | 8/2020 | Mahajan | G01S 17/931 |
| 2020/0265247 A1* | 8/2020 | Musk | G06N 20/00 |
| 2021/0402988 A1* | 12/2021 | Zhang | B60W 30/06 |
| 2022/0153259 A1* | 5/2022 | Suddamalla | G06T 7/20 |
| 2022/0189305 A1* | 6/2022 | Heikal | G01C 21/3685 |
| 2023/0031425 A1* | 2/2023 | Polisetty | B60W 30/06 |
| 2023/0394848 A1* | 12/2023 | Pan | H04N 23/54 |
| 2024/0096105 A1* | 3/2024 | Zhao | G06V 10/44 |
| 2024/0227785 A1* | 7/2024 | Wang | G06V 10/46 |
| 2024/0240963 A1* | 7/2024 | Kitaura | B60R 99/00 |
| 2024/0346930 A1* | 10/2024 | Lyu | G08G 1/143 |

* cited by examiner

SYSTEM FOR PROVIDING PARKING GUIDANCE TO A VEHICLE

INTRODUCTION

The present disclosure relates to a parking system for providing guidance to a user of a vehicle while executing a parking maneuver.

Parking systems typically include cameras that provide image data that is used for video assistance to a driver when a vehicle is shifted into reverse gear. The cameras provide image data of the vehicle's surroundings. A video representing the image data may be shown upon an infotainment display located within an interior cabin of the vehicle when the vehicle is shifted into reverse, where the video aids the driver while parking the vehicle.

It is to be appreciated that some types of parking spaces may not require a driver to shift the vehicle into reverse gear to complete a parking maneuver. In particular, perpendicular parking spaces and angle type parking spaces do not require a driver to shift the vehicle into reverse, but parallel parking spaces as well as perpendicular back parking spaces do require the vehicle to be shifted into reverse. However, most individuals still shift their vehicle into reverse when performing a parking maneuver, even when it may not be necessary, just so that the rear view or surround view of the environment surrounding the vehicle is shown upon the infotainment display. Such an approach is not efficient and does not provide an optimal user experience. This is because once the vehicle is shifted into reverse by a driver, the driver may then realize he or she still needs to drive forward and shift the vehicle back into drive. Also, sometimes a driver may realize the vehicle is already properly parked after shifting into reverse. This may not be optimal for vehicles equipped with start-stop engines, since shifting into reverse starts the engine and adversely affects fuel efficiency.

Some parking systems provide guidance to a driver when parking a vehicle as well. For example, one type of parking system may include ultrasonic sensors located in the front and rear bumpers that used to calculate a distance between surrounding objects and the vehicle. When the parking system determines the distance between the vehicle and a surrounding object is too close, the parking system may provide an alert to the driver. However, sometimes a driver may need additional assistance when performing a parking maneuver.

Thus, while current parking systems achieve their intended purpose, there is a need in the art for an improved parking system that provides enhanced guidance to park a vehicle.

SUMMARY

According to several aspects, a parking system for a vehicle including a braking system is disclosed. The parking system includes one or more cameras capturing image data representative of an environment surrounding the vehicle, a display located within an interior cabin of the vehicle, where the display shows image data representative of the environment surrounding the vehicle, and one or more controllers in electronic communication with the one or more cameras and the display. The one or more controllers executes instructions to receive an activation signal indicating a user of the vehicle is activating the braking system of the vehicle. In response to receiving the activation signal, the one or more controllers monitor the image data received from the one or more cameras. The one or more controllers detect one or more boundary features located along a roadway in the environment surrounding the vehicle based on the image data. In response to detecting the one or more boundary features located along the roadway, the one or more controllers recognize the one or more boundary as either features associated with a parking spot or features associated with adjacent lanes disposed along a roadway based on one or more machine learning techniques. In response to recognizing the one or more boundary features as the features associated with the parking spot, the one or more controllers determine the user is about to execute a parking maneuver. In response to determining the user is about to execute the parking maneuver, the one or more controllers instruct the display to show the image data representative of the environment surrounding the vehicle.

In another aspect, the image data represents one of a surround view and a rear view of the environment surrounding the vehicle.

In yet another aspect, the features associated with the parking spot include at least one of the following: parking lines and parking blocks disposed along a roadway.

In an aspect, the features associated with adjacent lanes disposed along a roadway include lane lines that separate adjacent lanes in a roadway from one another.

In another aspect, the one or more controllers execute instructions to detect neighboring obstacles that completely define a prospective parking spot based on the image data representative of the environment surrounding the vehicle and determine a size of the prospective parking spot based on the image data. The size of the prospective parking spot is determined by measuring distances between the neighboring obstacles that define the prospective parking spot.

In yet another aspect, the one or more controllers execute instructions to compare the size of the prospective parking spot with overall dimensions of the vehicle. In response to determining the size of the prospective parking spot is greater than the overall dimensions of the vehicle, the one or more controllers provide guidance to the user while executing the parking maneuver to steer the vehicle into the prospective parking spot.

In an aspect, the one or more controllers execute instructions to detect neighboring obstacles and one or more parking lines that define a prospective parking spot based on the image data representative of an environment surrounding the vehicle. The one or more controllers determine a size of the prospective parking spot based on the image data, where the size of the prospective parking spot is determined by measuring distances between the neighboring obstacles and the one or more parking lines that define the prospective parking spot.

In another aspect, the one or more controllers execute instructions to compare the size of the prospective parking spot with overall dimensions of the vehicle. In response to determining the size of the prospective parking spot is greater than the overall dimensions of the vehicle, the one or more controllers provide guidance to the user while executing the parking maneuver to steer the vehicle into the prospective parking spot.

In yet another aspect, the one or more controllers execute instructions to receive a speed signal indicating the vehicle is traveling at a threshold speed, determine the vehicle is traveling at the threshold speed in response to receiving the speed signal, and in response to determining the vehicle is traveling at the threshold speed, the one or more controllers instruct the display to stop showing the image data representative of the environment surrounding the vehicle.

In an aspect, the parking system includes one or more haptic devices in electronic communication with the one or more controllers.

In another aspect, the one or more haptic devices include a haptic device located on a left side of a seat of the user and a haptic device located on a right side of the seat of the user.

In another aspect, the one or more controllers execute instructions to activate the haptic device located on the right side of the seat when instructing the user to steer a hand wheel counter-clockwise.

In yet another aspect, the one or more controllers execute instructions to activate the haptic device on the left side of the seat to instruct the user to steer a hand wheel clockwise.

In an aspect, method for operating a parking system for a vehicle is disclosed. The method includes receiving, by one or more controllers, an activation signal indicating a user of the vehicle is activating a braking system of the vehicle. In response to receiving the activation signal, the method includes monitoring one or more cameras for image data representative of an environment surrounding the vehicle by the one or more controllers. The method includes detecting one or more boundary features located along a roadway in the environment surrounding the vehicle based on the image data. In response to detecting the one or more boundary features located along the roadway, the method includes recognizing the one or more boundary as either features associated with a parking spot or features associated with adjacent lanes disposed along a roadway based on one or more machine learning techniques. In response to recognizing the one or more boundary features as the features associated with the parking spot, the method includes determining the user is about to execute a parking maneuver. In response to determining the user is about to execute the parking maneuver, the method includes instructing a display to show the image data representative of the environment surrounding the vehicle.

In another aspect, the method includes detecting neighboring obstacles that completely define a prospective parking spot based on the image data representative of the environment surrounding the vehicle. The method includes determining a size of the prospective parking spot based on the image data, where the size of the prospective parking spot is determined by measuring distances between the neighboring obstacles that define the prospective parking spot.

In yet another aspect, the method includes comparing the size of the prospective parking spot with overall dimensions of the vehicle. In response to determining the size of the prospective parking spot is greater than the overall dimensions of the vehicle, the method includes providing guidance to the user while executing the parking maneuver to steer the vehicle into the prospective parking spot.

In an aspect, the method includes detecting neighboring obstacles and one or more parking lines that define a prospective parking spot based on the image data representative of an environment surrounding the vehicle and determining a size of the prospective parking spot based on the image data. The size of the prospective parking spot is determined by measuring distances between the neighboring obstacles and the one or more parking lines that define the prospective parking spot.

In another aspect, the method includes comparing the size of the prospective parking spot with overall dimensions of the vehicle. In response to determining the size of the prospective parking spot is greater than the overall dimensions of the vehicle, the method includes providing guidance to the user while executing the parking maneuver to steer the vehicle into the prospective parking spot.

In yet another aspect, the method includes receiving a speed signal indicating the vehicle is traveling at a threshold speed, determining the vehicle is traveling at the threshold speed in response to receiving the speed signal. In response to determining the vehicle is traveling at the threshold speed, the method includes instructing the display to stop showing the image data representative of the environment surrounding the vehicle.

In another aspect, a parking system for a vehicle including a braking system is disclosed. The parking system includes a global positioning system (GPS) providing data indicating a geographic position of the vehicle, one or more cameras capturing image data representative of an environment surrounding the vehicle, a display located within an interior cabin of the vehicle, where the display shows image data representative of the environment surrounding the vehicle, and one or more controllers in electronic communication with the one or more cameras and the display. The one or more controllers executing instructions to receive an activation signal indicating a user of the vehicle is activating the braking system of the vehicle. The one or more controllers determine a current speed of the vehicle is less than a threshold speed and determine the vehicle is located in an area where vehicles are parked based on the data indicating a geographic position of the vehicle. In response to receiving the activation signal, the one or more controllers determine the current speed of the vehicle is less than a threshold speed, and determine the vehicle is located in an area where vehicles are parked based on the data indicating a geographic position of the vehicle, and determining the user is about to execute a parking maneuver. In response to determining the user is about to execute the parking maneuver, the one or more controllers instruct the display to show the image data representative of the environment surrounding the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
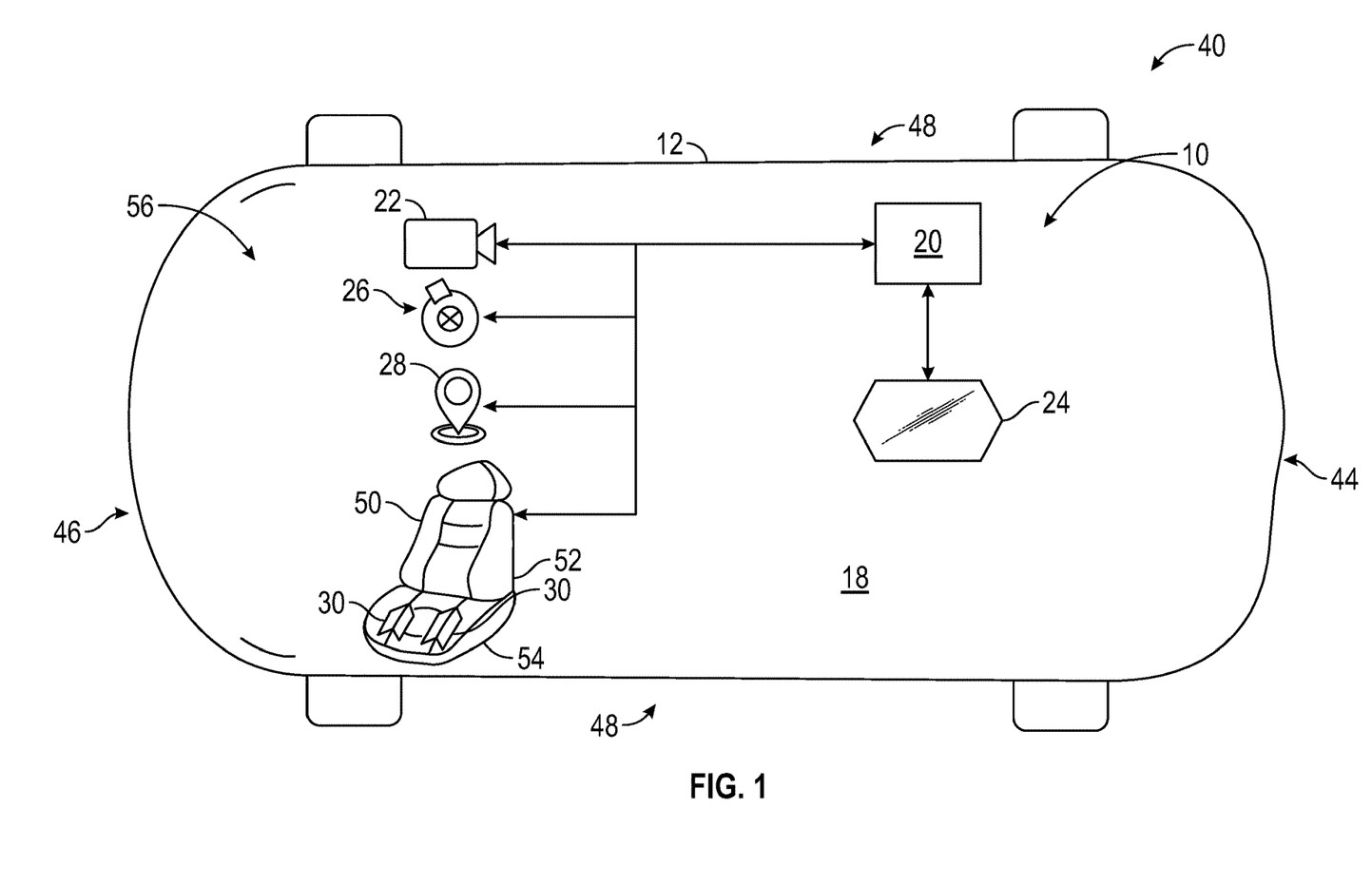
FIG. 1 is a schematic diagram of a vehicle including the disclosed parking system, according to an exemplary embodiment.

Referring to FIG. 1, an exemplary parking system 10 for providing guidance to a vehicle 12 performing a parking maneuver is illustrated. It is to be appreciated that the vehicle 12 may be any type of vehicle such as, but not limited to, a sedan, truck, sport utility vehicle, van, or motor home. The parking system 10 includes one or more controllers 20 in electronic communication with one or more cameras 22, a display 24 located within an interior cabin 18 of the vehicle 12, a braking system 26, a global positioning system (GPS) 28, and one or more haptic devices 30. The one or more cameras 22 capture image data representative of an environment 40 surrounding the vehicle 12. As explained below, the environment 40 surrounding the vehicle 12 may include one or more parking spots 42 (shown in FIG. 2A), where the vehicle 12 is performing a parking maneuver into a respective parking spot 42. The display 24 shows the image data captured by the one or more cameras 22, where the image data is representative of the environment 40 surrounding the vehicle. In one embodiment, the one or more cameras 22 may be placed along the front 44, rear 46, sides 48, and top 56 of the vehicle 12 to provide image data representing a surround view of the environment 40 surrounding the vehicle 12. It is to be appreciated that the surround view includes a front view of the environment 40 as well. In another embodiment, a user may switch from a front view to a rear view of the environment 40 surrounding the vehicle 12 by entering input into an input device, such as a button shown upon the display 24.

As explained below, the one or more controllers 20 determine the user of the vehicle 12 is about to execute a parking maneuver into one of the parking spots 42 (FIG. 2A) based on the image data collected by the one or more cameras 22. In response to determining a user of the vehicle 12 is activating the braking system 26 and that the user is about to execute a parking maneuver into one of the parking spots 42 (FIG. 2A), the disclosed parking system 10 instructs the display 24 to show the image data representative of the environment 40 surrounding the vehicle 12. The parking system 10 provides the user with a view of the environment 40 surround the vehicle 12 shown upon the display 24, without the need for the user to shift the vehicle 12 into reverse gear, unlike conventional systems that are presently available. As explained below, in one embodiment, the parking system 10 also provides guidance to the user while executing the parking maneuver into one of the parking spots 42. In an alternative embodiment, instead of determining the vehicle 12 is about to execute a parking maneuver based on the image data collected by the one or more cameras 22, the one or more controllers 20 determine the vehicle 12 is about the execute the parking maneuver based on a geographic position of the vehicle 12 determined by the GPS 28, a current speed of the vehicle 12, and in response to the user activating the braking system 26.

Continuing to refer to FIG. 1, the one or more haptic devices 30 may include any type of device for generating a tactile sensation that captures the attention of a user. In the non-limiting embodiment as shown in FIG. 1, the one or more haptic devices 30 include haptic devices 30 located on a left side 50 and a right side 52 of a seat 54 of the user. The one or more controllers 20 may active the haptic device 30 located on the left side 50 of the seat 54 to instruct the user to steer a hand wheel clockwise and the haptic device 30 on the right side 52 of the seat 54 to instruct the user to steer the hand wheel counter-clockwise.

Figure 2A:
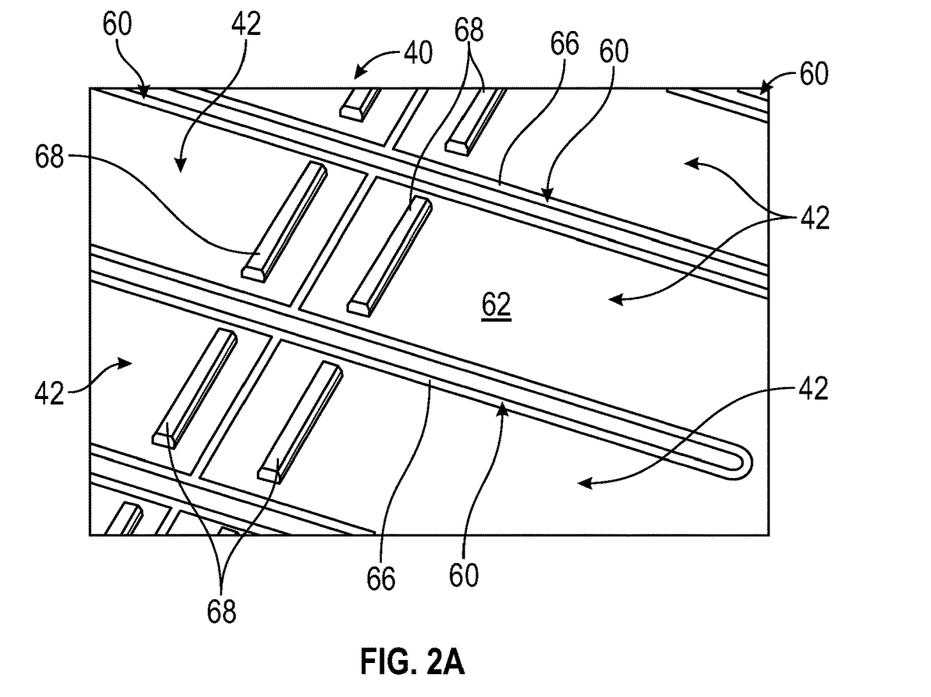
FIG. 2A illustrates a plurality of parking spots, where the vehicle shown in FIG. 1 may perform a parking maneuver into one of the parking spots, according to an exemplary embodiment.

Referring to both FIGS. 1 and 2A, the one or more controllers 20 receive an activation signal from the braking system 26 of the vehicle 12, where the activation signal indicates the user of the vehicle 12 is activating the braking system 26. In other words, the activation signal is generated by the braking system 26 in response to the user depressing a brake pedal. The activation signal signifies that the vehicle 12 is slowing down or reducing speed while approaching the parking spots 42 (FIG. 2A). In response to receiving the activation signal from the braking system 26, the one or more controllers 20 monitor the image data received from the one or more cameras 22 for one or more boundary features 60 located along a roadway 62 in the environment 40 surrounding the vehicle 12 based on one or more image recognition techniques.

The one or more boundary features 60 represent markings on the roadway 62 or, in the alternative, an object located along the roadway 62, where the marking or object signifies either features associated with the parking spot 42 (FIG. 2A) or features associated with adjacent lanes 74 (FIG. 2C) disposed along the roadway 62. As seen in FIG. 2A, the one or more boundary features 60 signify features associated with the parking spot 42. In the example as shown in FIG. 2A, the one or more boundary features 60 that signify the parking spot 42 include parking lines 66 and parking blocks 68 disposed along the roadway 62. The parking lines 66 are painted along the roadway 62 to signify the boundaries of the parking spots 42. The parking blocks 68 are disposed along the roadway 62 and act as barriers for the parking spots 42. The parking blocks 68 are constructed of materials such as concrete or rubber. In the embodiment as shown in FIG. 2D, the one or more boundary features 60 that signify the parking spot 42 include a curb 64 of the roadway 62. In the example as shown in FIG. 2D, the parking spot 42 is a parallel parking spot that is defined, in part, by the curb 64 of the roadway 62.

Figure 2B:
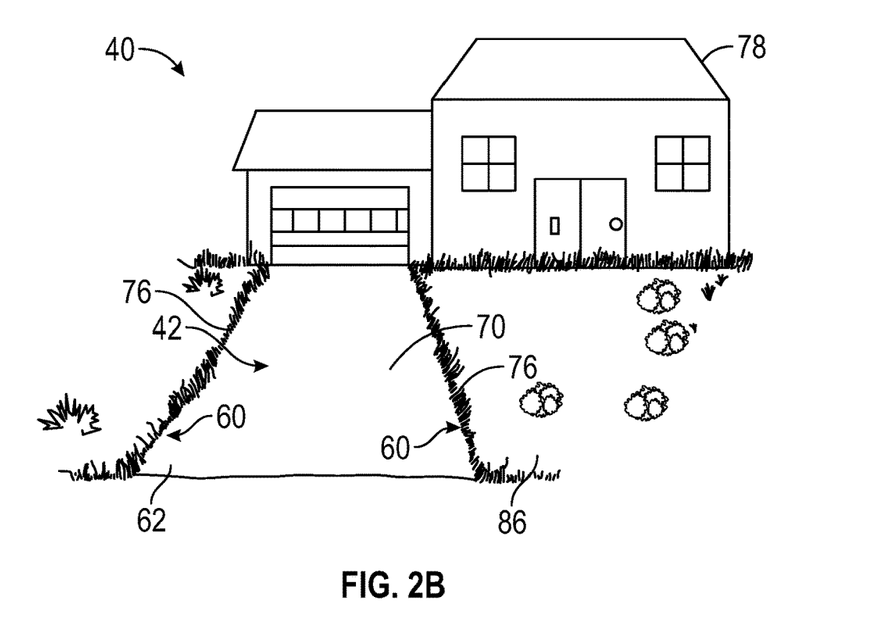
FIG. 2B illustrates a driveway, where the vehicle shown in FIG. 1 may perform a parking maneuver into the driveway, according to an exemplary embodiment.
Figure 2C:
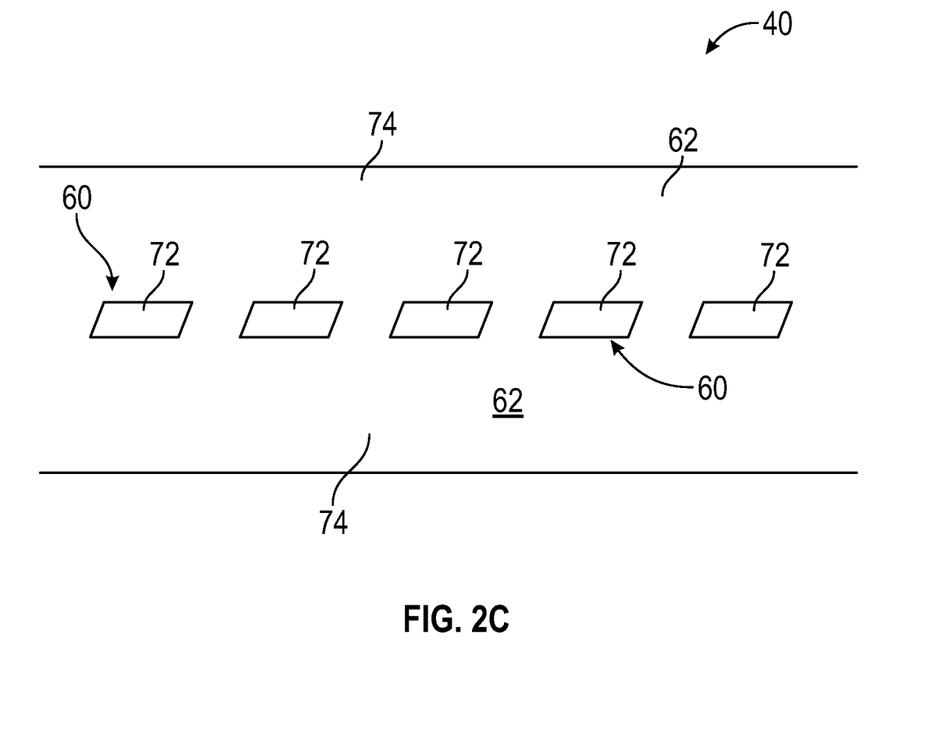
FIG. 2C illustrates a plurality of lane lines disposed along a roadway, according to an exemplary embodiment.
Figure 2D:
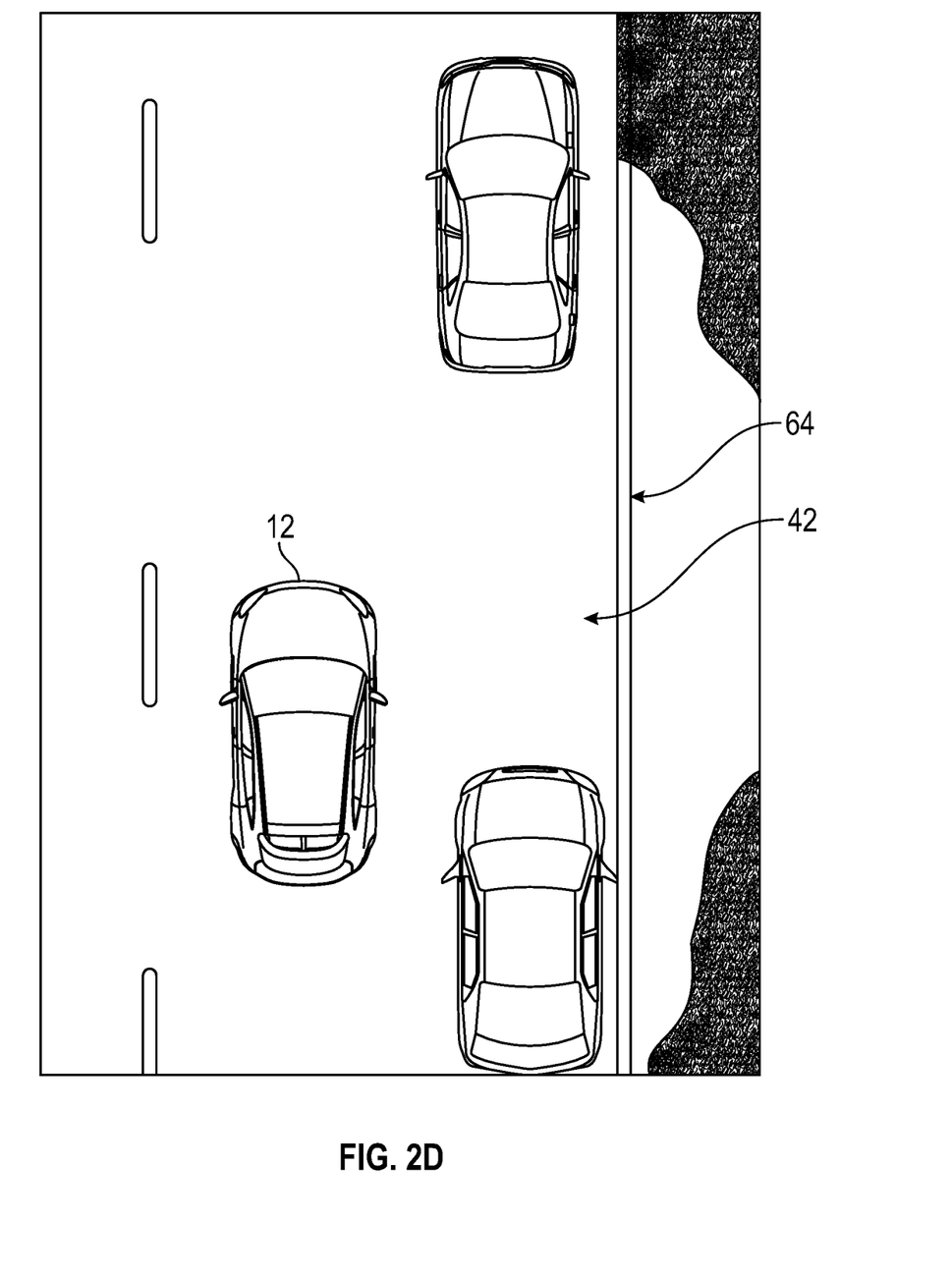
FIG. 2D illustrates a parallel parking spot, according to an exemplary embodiment.

In the example as shown in FIG. 2B, the parking spot 42 is located along a driveway 70, and the one or more boundary features 60 include a border 76 formed between the driveway 70 of a residence 78 and a grassy area 86 surrounding the driveway 70. In the example as shown in FIG. 2C, the one or more boundary features 60 signify features associated with the adjacent lanes 74 on the roadway 62. Specifically, the one or more boundary features 60 are lane lines 72 disposed along the roadway 62, where the lane lines 72 separate adjacent lanes 74 in the roadway 62 from one another. In response to detecting the one or more boundary features 60 located along the roadway 62, the one or more controllers 20 recognize the one or more boundary features 60 as either features associated with the parking spot 42 or features associated with the adjacent lanes 74 on the roadway 62 based on one or more machine learning techniques. Some examples of machine learning techniques that may be used to recognize the one or more boundary features 60 include, but are not limited to, neural networks, and in particular deep neural networks.

If the one or more controllers 20 recognize the one or more boundary features 60 as features associated with the adjacent lanes 74 on the roadway 62 (FIG. 2C), then the one or more controllers 20 determine the vehicle 12 is driving along a local road or highway versus a parking lot or other area where vehicles are parked. Therefore, the user of the vehicle 12 does not require guidance to perform a parking maneuver. However, in response to recognizing the one or more boundary features 60 as features associated with the parking spot 42 (FIG. 2A), the one or more controllers 20 instruct the display 24 to show the image data representative of the environment 40 surrounding the vehicle 12. Therefore, the user does not need to shift the vehicle 12 into reverse to view the environment 40 surrounding the vehicle 12 on the display 24.

In an embodiment, the one or more controllers 20 receive a speed signal indicating the vehicle 12 is traveling at a threshold speed. The threshold speed indicates that the user of the vehicle 12 no longer intends to park the vehicle 12, and therefore has increased the current speed of the vehicle 12. In response to determining the vehicle 12 is traveling at a threshold speed, the one or more controllers 20 instruct the display 24 to stop showing the image data representative of the environment 40 surrounding the vehicle 12. In one non-limiting embodiment, the threshold speed may range from about eight kilometers per hour (kph) to about thirteen kph (approximately between five miles per hour (mph) to eight mph).

Figure 3A:
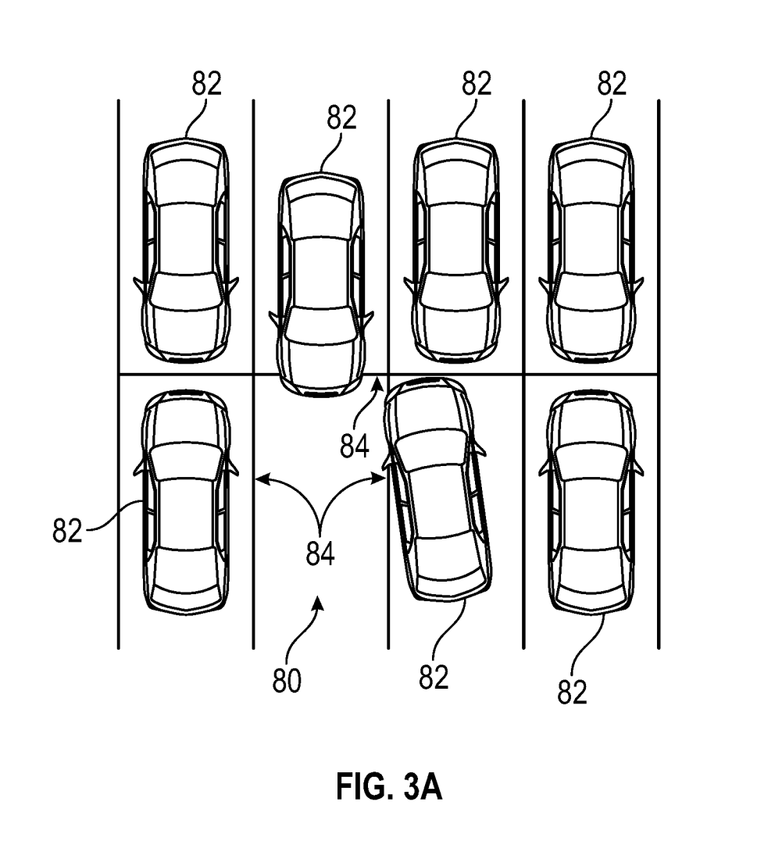
FIG. 3A illustrates an empty prospective parking spot that is completely defined by surrounding obstacles, according to an exemplary embodiment.

In one embodiment, the parking system 10 also provides guidance to the user of the vehicle 12 while the user is executing a parking maneuver. FIG. 3A is an illustration of an empty prospective parking spot 80 defined completely by neighboring obstacles 82. In other words, the neighboring obstacles 82 completely bound all three sides 84 the prospective parking spot 80. In the example as shown in FIG. 3A, the neighboring obstacles 82 are neighboring vehicles. However, it is to be appreciated that the neighboring obstacles 82 are not limited to vehicles, and in another example the neighboring obstacles 82 may include trailers, parking blocks, shopping cart corrals, trees, waste bins, buildings, and electric vehicle (EV) charging stations. Referring to both FIGS. 1 and 3A, the one or more controllers 20 detect the neighboring obstacles 82 that completely define the prospective parking spot 80 based on the image data collected by the one or more cameras 22.

Figure 3B:
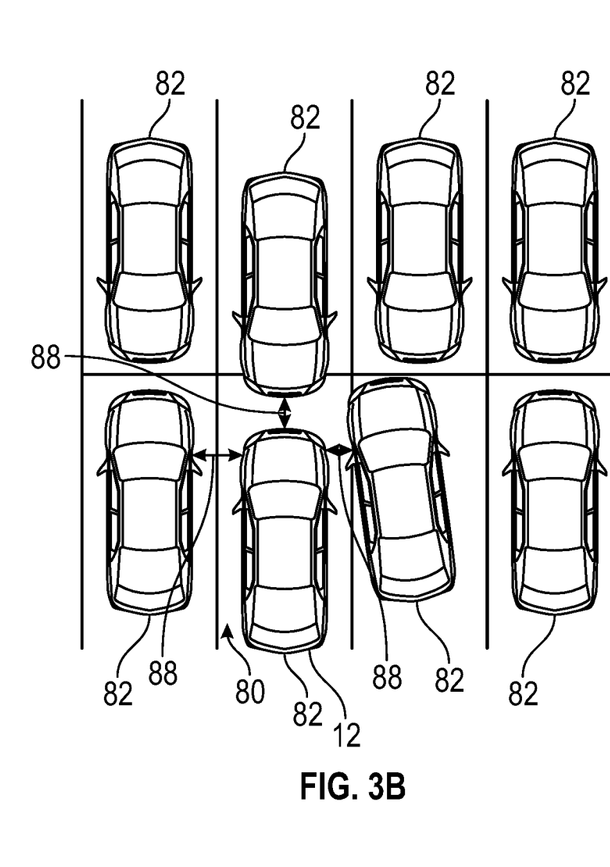
FIG. 3B illustrates the vehicle parked in the prospective parking spot shown in FIG. 3A, according to an exemplary embodiment.

In the example as shown in FIG. 3A, the one or more controllers 20 measure determine a size of the prospective parking spot 80 by measuring distances between the neighboring obstacles 82 that define the three sides 84 of the prospective parking spot 80. The one or more controllers 20 compare the size of the prospective parking spot 80 with overall dimensions of the vehicle 12 to determine whether the prospective parking spot 80 is large enough to accommodate the vehicle 12. In response to determining the size of the prospective parking spot 80 is greater than the overall dimensions of the vehicle 12, the one or more controllers 20 provide guidance to the user executing a parking maneuver to steer the vehicle 12 into the prospective parking spot 80. Referring specifically to FIG. 3B, the guidance instructs the user to position the vehicle 12 equidistant with respect to the neighboring obstacles 82 that surround the vehicle 12. The one or more controllers 20 provide instructions in the form of text and graphics that are shown upon the display 24 to guide the user while parking the vehicle 12 into the prospective parking spot 80. In embodiments, the instructions may be shown by a head-up display instead. The one or more controllers 20 also activate the haptic devices 30 located on the left side 50 and the right side 52 of the seat 54 to guide the user to steer the vehicle 12 into the prospective parking spot 80. As seen in FIG. 3B, when the vehicle 12 is parked within the prospective parking spot 80, an equal distance 88 is measured between the vehicle 12 and the neighboring obstacles 82.

Figure 4A:
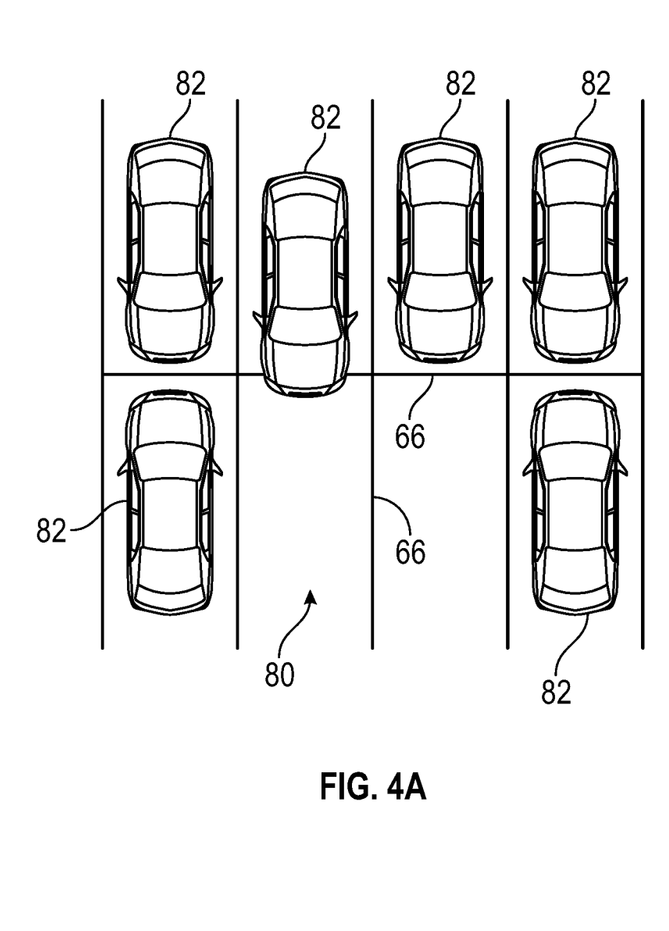
FIG. 4A illustrates an empty prospective parking spot defined by surrounding obstacles and parking lines, according to an exemplary embodiment.
Figure 4B:
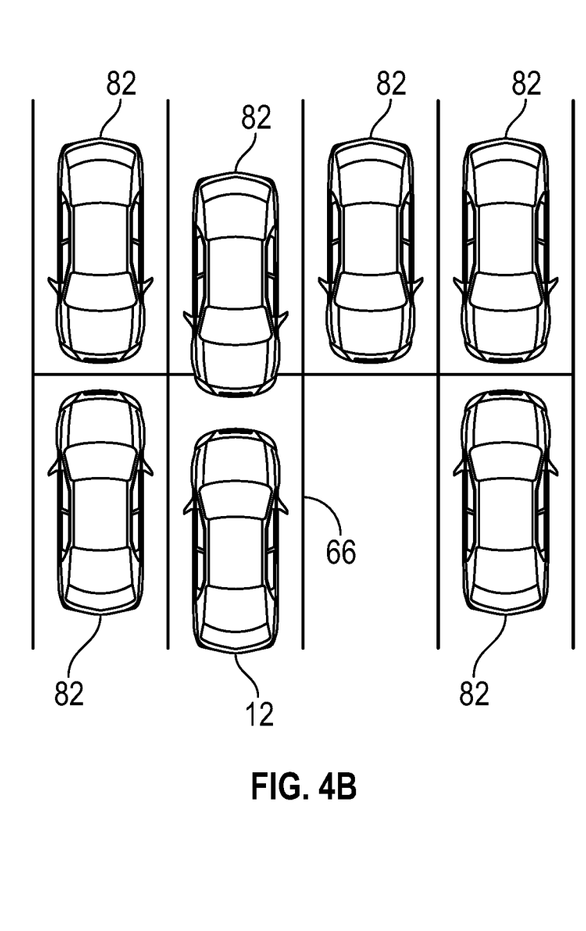
FIG. 4B illustrates the vehicle parked in the prospective parking spot shown in FIG. 3A, according to an exemplary embodiment.

FIG. 4A is an illustration of the empty prospective parking spot 80 defined by both the neighboring obstacles 82 as well as one or more parking lines 66, and FIG. 4B is an illustration of the vehicle 12 parking in the empty prospective parking spot 80. In the example as shown in FIG. 4A, the prospective parking spot 80 is defined by the neighboring obstacles 82 and a parking line 66 disposed to the right of the prospective parking spot 80, however, it is to be appreciated that FIGS. 4A and 4B are merely exemplary in nature and the prospective parking spot 80 may be defined in a variety of different approaches. Indeed, in another embodiment, the prospective parking spot 80 may be defined by parking lines 66 to both the right and the left of the prospective parking spot 80. Alternatively, in another approach, the prospective parking spot 80 may be defined entirely by the parking lines 66. Referring to both FIGS. 1 and 4A, the one or more controllers 20 detect the neighboring obstacles 82 and one or more parking lines 66 that define the prospective parking spot 80 based on the image data collected by the one or more cameras 22.

In the example as shown in FIG. 4A, the one or more controllers 20 measure determine the size of the prospective parking spot 80 by measuring distances between the neighboring obstacles 82 and the parking lines 66 that define the prospective parking spot 80. The one or more controllers 20 compare the size of the prospective parking spot 80 with overall dimensions of the vehicle 12 to determine whether the prospective parking spot 80 is large enough to accommodate the vehicle 12. In response to determining the size of the prospective parking spot 80 is greater than the overall dimensions of the vehicle 12, the one or more controllers 20 provide guidance to the user executing a parking maneuver to steer the vehicle 12 into the prospective parking spot 80.

Figure 5:
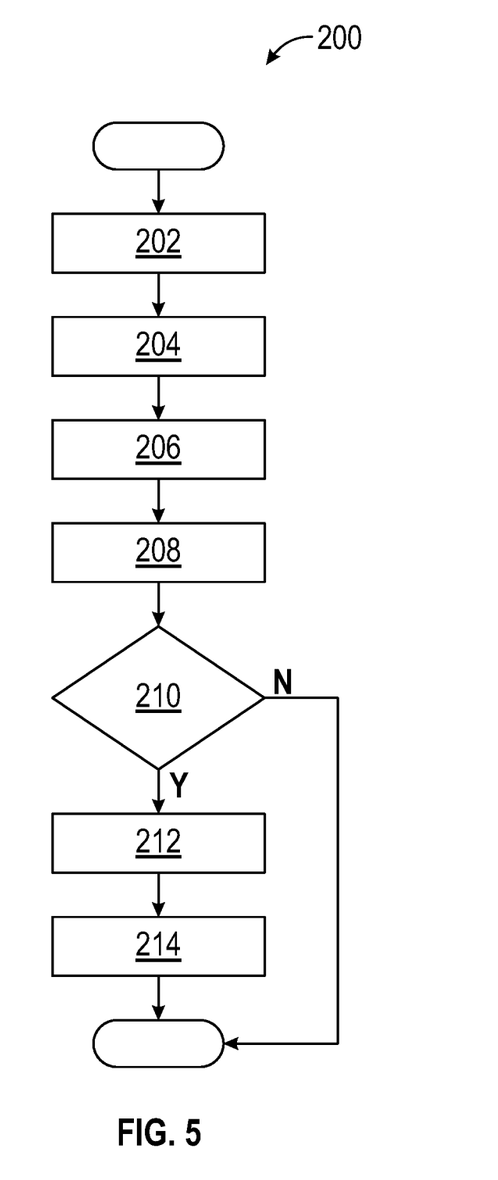
FIG. 5 is a process flow diagram illustrating a method for operating the disclosed parking system shown in FIG. 1, according to an exemplary embodiment.

FIG. 5 is an exemplary process flow diagram illustrating a method 200 of operating the parking system 10 shown in FIG. 1. Referring to FIGS. 1, 2A-2C, and 5, the method 200 may begin at block 202. In block 202, the one or more controllers 20 receive the activation signal indicating the user of the vehicle 12 is activating the braking system 26. The method 200 may then proceed to block 204.

In block 204, in response to receiving the activation signal, the one or more controllers 20 monitor the image data received from the one or more cameras 22. The method 200 may then proceed to block 206.

In block 206, the one or more controllers 20 detect one or more boundary features 60 (seen in FIGS. 2A-2C) located along the roadway 62 in the environment 40 surrounding the vehicle 12. The method 200 may then proceed to block 208.

In block 208, in response to detecting the one or more boundary features 60 located along the roadway 62, the one or more controllers 20 execute one or more machine learning techniques to recognize the one or more boundary features 60 as either signify either features associated with the parking spot 42 (FIG. 2A) or features associated with the adjacent lanes 74 (FIG. 2C) disposed along the roadway 62. The method 200 may then proceed to decision block 210.

In decision block 210, if the one or more controllers 20 recognize the one or more boundary features 60 as features associated with the adjacent lanes 74 disposed along the roadway 62, then the one or more controllers 20 determine the vehicle 12 is driving along a local road or highway versus a parking lot or other area where vehicles are parked. Accordingly, the user of the vehicle 12 does not require guidance to perform a parking maneuver, and the method 200 may terminate. However, in response to recognizing the one or more boundary features 60 associated with the parking spot 42 (FIG. 2A), the one or more controllers 20 determine the user is about to execute a parking maneuver. In response to determining the user is about to execute the parking maneuver, the one or more controllers 20 instruct the display 24 to show the image data representative of the environment 40 surrounding the vehicle 12. The method 200 may then proceed to block 212.

In block 212, the one or more controllers 20 continue to show the image data until receiving the speed signal indicating the vehicle 12 is traveling at the threshold speed. As mentioned above, the threshold speed indicates that the user of the vehicle 12 no longer intends to park the vehicle 12. The method 200 may then proceed to block 214.

In block 214, in response to determining the vehicle 12 is traveling at a threshold speed, the one or more controllers 20 instruct the display 24 to stop showing the image data representative of the environment 40 surrounding the vehicle 12. The method 200 may then terminate.

In another embodiment, instead of determining the vehicle 12 is about to execute a parking maneuver based on the image data collected by the one or more cameras 22, the one or more controllers 20 determine the vehicle 12 is about the execute the parking maneuver based on a geographic position of the vehicle 12, a current speed of the vehicle 12, and in response to receiving the activation signal indicating the user of the vehicle 12 is activating the braking system 26. Specifically, the one or more controllers 20 monitor the current speed of the vehicle 12 and also receive data from the GPS 28 indicating the geographic position of the vehicle 12. The one or more controllers 20 instruct the display 24 to show the image data representative of the environment 40 surrounding the vehicle 12 in response to determining the current speed of the vehicle 12 is less than the threshold speed, receiving the activation signal indicating the user of the vehicle 12 is activating the braking system 26, and determining the vehicle 12 is located in an area where vehicles are parked, based on the data received from the GPS 28.

Referring generally to the figures, the disclosed parking system provides various technical effects and benefits. Specifically, the parking system provides an approach for activating a camera view of a vehicle's surroundings, without the need for a driver to shift the vehicle into reverse, which in turn improves the overall customer experience. The parking system may also improve fuel economy in vehicles equipped with start-stop engines, since shifting into reverse starts the start-stop engine and adversely affects fuel efficiency. The disclosed parking system also provides an enhanced approach for providing guidance to a user while executing a parking maneuver. In particular, the disclosed parking system guides the user to park the vehicle equidistant from neighboring vehicles, which is considered an optimal parking position.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A parking system for a vehicle including a braking system, the parking system comprising:
   one or more cameras capturing image data representative of an environment surrounding the vehicle;
   a display located within an interior cabin of the vehicle, wherein the display shows image data representative of the environment surrounding the vehicle; and
   one or more controllers in electronic communication with the one or more cameras and the display, the one or more controllers executing instructions to:
   receive an activation signal indicating a user of the vehicle is activating the braking system of the vehicle;
   in response to receiving the activation signal, monitor the image data received from the one or more cameras;
   detect one or more boundary features located along a roadway in the environment surrounding the vehicle based on the image data;
   in response to detecting the one or more boundary features located along the roadway, recognize the one or more boundary as either features associated with a parking spot or features associated with adjacent lanes disposed along a roadway based on one or more machine learning techniques;
   in response to recognizing the one or more boundary features as the features associated with adjacent lanes disposed along a roadway, determine the vehicle is driving along a road and the user of the vehicle does not require guidance to perform a parking maneuver;
   in response to recognizing the one or more boundary features as the features associated with the parking spot, determine the user is about to execute a parking maneuver;
   in response to determining the user is about to execute the parking maneuver, instruct the display to show the image data representative of the environment surrounding the vehicle;
   detect neighboring obstacles that completely define a prospective parking spot based on the image data representative of the environment surrounding the vehicle;
   determine a size of the prospective parking spot based on the image data, wherein the size of the prospective parking spot is determined by measuring distances between the neighboring obstacles that define the prospective parking spot;
   compare the size of the prospective parking spot with overall dimensions of the vehicle; and in response to determining the size of the prospective parking spot is greater than the overall dimensions of the vehicle, provide guidance to the user while executing the parking maneuver to steer the vehicle into the prospective parking spot.

2. The parking system of claim 1, wherein the image data represents one of a surround view and a rear view of the environment surrounding the vehicle.

3. The parking system of claim 1, wherein the features associated with the parking spot include at least one of the following: parking lines and parking blocks disposed along a roadway.

4. The parking system of claim 1, wherein the features associated with adjacent lanes disposed along a roadway include lane lines that separate adjacent lanes in a roadway from one another.

5. The parking system of claim 1, wherein the one or more controllers execute instructions to:
    detect neighboring obstacles and one or more parking lines that define a prospective parking spot based on the image data representative of an environment surrounding the vehicle; and
    determine a size of the prospective parking spot based on the image data, wherein the size of the prospective parking spot is determined by measuring distances between the neighboring obstacles and the one or more parking lines that define the prospective parking spot.

6. The parking system of claim 5, wherein the one or more controllers execute instructions to:
    compare the size of the prospective parking spot with overall dimensions of the vehicle; and
    in response to determining the size of the prospective parking spot is greater than the overall dimensions of the vehicle, provide guidance to the user while executing the parking maneuver to steer the vehicle into the prospective parking spot.

7. The parking system of claim 1, wherein the one or more controllers execute instructions to:
    receive a speed signal indicating the vehicle is traveling at a threshold speed;
    determine the vehicle is traveling at the threshold speed in response to receiving the speed signal; and
    in response to determining the vehicle is traveling at the threshold speed, instruct the display to stop showing the image data representative of the environment surrounding the vehicle.

8. The parking system of claim 1, further comprising one or more haptic devices in electronic communication with the one or more controllers.

9. The parking system of claim 8, wherein the one or more haptic devices include a haptic device located on a left side of a seat of the user and a haptic device located on a right side of the seat of the user.

10. The parking system of claim 9, wherein the one or more controllers execute instructions to activate the haptic device located on the right side of the seat when instructing the user to steer a hand wheel counter-clockwise.

11. The parking system of claim 9, wherein the one or more controllers execute instructions to activate the haptic device on the left side of the seat to instruct the user to steer a hand wheel clockwise.

12. A method for operating a parking system for a vehicle, the method comprising:
    receiving, by one or more controllers, an activation signal indicating a user of the vehicle is activating a braking system of the vehicle;
    in response to receiving the activation signal, monitoring one or more cameras for image data representative of an environment surrounding the vehicle by the one or more controllers;
    detecting one or more boundary features located along a roadway in the environment surrounding the vehicle based on the image data;
    in response to detecting the one or more boundary features located along the roadway, recognizing the one or more boundary as either features associated with a parking spot or features associated with adjacent lanes disposed along a roadway based on one or more machine learning techniques;
    in response to recognizing the one or more boundary features as the features associated with adjacent lanes disposed along a roadway, determining the vehicle is driving along a road and the user of the vehicle does not require guidance to perform a parking maneuver;
    in response to recognizing the one or more boundary features as the features associated with the parking spot, determining the user is about to execute a parking maneuver;
    in response to determining the user is about to execute the parking maneuver, instructing a display to show the image data representative of the environment surrounding the vehicle;
    detecting neighboring obstacles and one or more parking lines that define a prospective parking spot based on the image data representative of an environment surrounding the vehicle; and
    determining a size of the prospective parking spot based on the image data, wherein the size of the prospective parking spot is determined by measuring distances between the neighboring obstacles and the one or more parking lines that define the prospective parking spot;
    comparing the size of the prospective parking spot with overall dimensions of the vehicle; and
    in response to determining the size of the prospective parking spot is greater than the overall dimensions of the vehicle, providing guidance to the user while executing the parking maneuver to steer the vehicle into the prospective parking spot.

13. The method of claim 12, further comprising:
    detecting neighboring obstacles that completely define a prospective parking spot based on the image data representative of the environment surrounding the vehicle; and
    determining a size of the prospective parking spot based on the image data, wherein the size of the prospective parking spot is determined by measuring distances between the neighboring obstacles that define the prospective parking spot.

14. The method of claim 13, further comprising:
    comparing the size of the prospective parking spot with overall dimensions of the vehicle; and
    in response to determining the size of the prospective parking spot is greater than the overall dimensions of the vehicle, providing guidance to the user while executing the parking maneuver to steer the vehicle into the prospective parking spot.

15. The method of claim 12, further comprising:
    receiving a speed signal indicating the vehicle is traveling at a threshold speed;
    determining the vehicle is traveling at the threshold speed in response to receiving the speed signal; and in response to determining the vehicle is traveling at the threshold speed, instructing the display to stop showing the image data representative of the environment surrounding the vehicle.

16. A parking system for a vehicle including a braking system, the parking system comprising:
one or more cameras capturing image data representative of an environment surrounding the vehicle;
a display located within an interior cabin of the vehicle, wherein the display shows image data representative of the environment surrounding the vehicle; and
one or more controllers in electronic communication with the one or more cameras and the display, the one or more controllers executing instructions to:
receive an activation signal indicating a user of the vehicle is activating the braking system of the vehicle;
in response to receiving the activation signal, monitor the image data received from the one or more cameras;
detect one or more boundary features located along a roadway in the environment surrounding the vehicle based on the image data;
in response to detecting the one or more boundary features located along the roadway, recognize the one or more boundary as either features associated with a parking spot or features associated with adjacent lanes disposed along a roadway based on one or more machine learning techniques;
in response to recognizing the one or more boundary features as the features associated with adjacent lanes disposed along a roadway, determine the vehicle is driving along a road and the user of the vehicle does not require guidance to perform a parking maneuver;
in response to recognizing the one or more boundary features as the features associated with the parking spot, determine the user is about to execute a parking maneuver;
detect neighboring obstacles and one or more parking lines that define a prospective parking spot based on the image data representative of an environment surrounding the vehicle;
determine a size of the prospective parking spot based on the image data, wherein the size of the prospective parking spot is determined by measuring distances between the neighboring obstacles and the one or more parking lines that define the prospective parking spot;
compare the size of the prospective parking spot with overall dimensions of the vehicle; and
in response to determining the size of the prospective parking spot is greater than the overall dimensions of the vehicle, provide guidance to the user while executing the parking maneuver to steer the vehicle into the prospective parking spot.

17. The parking system of claim 16, wherein the image data represents one of a surround view and a rear view of the environment surrounding the vehicle.

18. The parking system of claim 16, wherein the features associated with the parking spot include at least one of the following: parking lines and parking blocks disposed along a roadway.

19. The parking system of claim 16, wherein the features associated with adjacent lanes disposed along a roadway include lane lines that separate adjacent lanes in a roadway from one another.

* * * * *